Nov. 17, 1964  T. C. ANDERSON ET AL  3,157,798
NOISE IMPULSE COUNTER FOR SIGNALLING CIRCUITS
Filed Oct. 1, 1962

INVENTORS T. C. ANDERSON
D. L. FAVIN
BY
Patrick J. Roche
ATTORNEY

United States Patent Office 3,157,798
Patented Nov. 17, 1964

3,157,798
NOISE IMPULSE COUNTER FOR SIGNALLING
CIRCUITS
Theodore C. Anderson, Morristown, and David L. Favin, Whippany, N.J., assignors to Bell Telephone Laboratories, Incorporated, New York, N.Y., a corporation of New York
Filed Oct. 1, 1962, Ser. No. 227,207
22 Claims. (Cl. 307—88.5)

This invention relates to an impulse noise voltage counter, and more specifically to such counter for indicating the number of impulse noise peaks having at least a preselected magnitude and rapidly occurring within a predetermined time interval on a voice transmission facility, without jamming the counter.

In assigning voice frequency transmission circuits to use with voice-band data transmission facilities in signaling transmission systems, it is essential to know the suitability of the circuits for that purpose. As the demand for such facilities maybe of the order of several hundred at a given time or several thousand over a relatively short period of time, it is imperative that the suitability, or the unsuitability, of the circuits should be determined from time to time with a minimum use of technical personnel. Such suitability should be available in the light of the bandwidth of the receiving data facilities with which the test circuits are to be utilized, the environment in which the data facilities are located, and the availability of skilled craftsmen for the purpose of supervising the testing operations involved.

Apparatus has been heretofore known to count automatically impulse noise peaks of at least a preselected magnitude over a predetermined period of time for evaluating the suitability of voice-band circuits for use with voice-frequency data facilities. It has been found that such apparatus, when including mechanically counting devices, tends to jam when the noise impulse peaks occur in rapid succession because mechanical inertia precludes the mechanical counter from operating and resetting in the short time periods intervening between such rapidly occurring noise impulses.

The present invention contemplates apparatus for counting rapidly occurring impulse noise peak voltages without jamming.

It is a principal object of the invention to provide apparatus for counting impulse noise peak voltages on an automatic basis without jamming.

It is another object to count impulse noise peak voltages with jam-proof apparatus which is light in weight and small in bulk whereby it is rendered expeditiously portable.

It is still another object to provide jam-proof apparatus for counting impulse noise peak voltages in environments of variable temperature and humidity.

It is a further object to provide jam-proof apparatus for counting impulse noise peak voltages in a manner that is simple in design and requiring minimum technical skill for its operation.

It is still a further object to count impulse noise peak voltages of opposite polarities in a predetermined frequency range with jam-proof apparatus.

In association with a voice-band signaling circuit transmitting impulse noise peak voltages of opposite polarities, a phase inverter to translate the positive peak voltages into negative pulse voltages for effecting full-wave rectification of the noise voltages, a monostable transistor flip-flop circuit, and a message register connected to the flip-flop transistor normally in the nonconducting state to count discrete peak voltages, the present invention comprises a pair of rectifiers to control the transmission of the negative peak voltages to the message register, a capacitor to couple the output of the rectifiers to the base of the transistor normally conducting, and a third rectifier having its anode connected to a point common to the anodes of the pair of rectifiers and one plate of the capacitor and its cathode to another point common to the collector of the normally nonconducting transistor and the operating circuit of the message register.

In operation, in the absence of an input to the pair of rectifiers, the first transistor of the flip-flop circuit is conducting while the second transistor thereof is nonconducting, and the capacitor is charged with a positive voltage in such sense that the capacitor plate having the smaller positive potential is connected to the base of the first or conducting transistor. At this time, the voltages on the cathodes and anodes of the respective rectifiers of the pair of rectifiers and of the third rectifier are substantially identical whereby all of said last-mentioned rectifiers are held at the threshold of conductivity. When a negative voltage pulse representing an input noise pulse of at least the predetermined magnitude is applied to either one of the pair of rectifiers, such one rectifier transmits the pulse via the capacitor to the base of the normally conducting transistor which is thereby turned off and the normally nonconducting transistor turned on. This actuates the message register to count one noise peak voltage. This establishes a potential across the cathode and anode of the third rectifier which is thereby turned on.

The capacitor is discharged through the turned-on second transistor to ground and thereafter is again charged with a positive potential in such sense that the capacitor plate of the larger positive voltage is now applied to the base of the first transistor. As this charge on the capacitor increases in an exponential manner, the potential now effective on the base of the first transistor also increases in a corresponding manner until it is again turned on and the second transistor is turned off. At this time, the voltage effective on the cathodes of each rectifier of the pair of rectifiers is substantially that of the +B supply while the voltage on their associated anodes is slightly above ground. During this time, the pair of rectifiers is biased in the reverse direction by the exponentially increasing voltage charge on the capacitor and is thereby turned off. At the time when the second transistor was turned off, its collector was effectively disconnected from the message register and the collector voltage was immediately returned to the +B supply thereby back-biasing the third rectifier.

Since the first transistor is again turned on as just mentioned, the capacitor is again so charged through the conducting first transistor that its voltage rises exponentially toward that of the +B supply and is eventually established in such sense that the capacitor plate connected to the base of the conducting first transistor is supplied with a substantially constant potential, viz., that of the base-emitter junction thereof. During the time interval required to change the charge of the capacitor from that at which the capacitor plate connected to the base of the first or normally conducting transistor had the larger magnitude of voltage to that at which the last-mentioned capacitor plate had the smaller magnitude of voltage, the pair of rectifiers and the third rectifier were turned off so that the second or normally nonconducting transistor was effectively disconnected from the noise peak input voltages. As a consequence, it was then impossible for any impulse noise peak input voltages to operate the message register whereby the latter was permitted to operate to count one input noise voltage and thereafter to reset itself before accepting the count of the next input noise peak. This tends to preclude any jamming of the message register when the noise input peak voltages occur in relatively rapid succession.

A feature of the invention is the establishment of a "dead time" interval to compensate for the mechanical inertia of the message register. That is to say, there is the provision of a time interval within which the message register is enabled to reset itself after counting a noise impulse peak voltage before it is presented to accept another noise impulse count. In other words, the message register is provided with a minimum definite time interval within which it can operate and return to the normal condition after counting each noise impulse peak voltage, particularly with respect to the largest magnitude of such voltage. This tends to preclude a jamming of the message register when the impulse noise peak voltages of relatively large magnitude occur in relatively rapid succession.

These and other objects of the invention are readily understood from the following description when taken together with the accompanying drawing in which.

Figure 1:
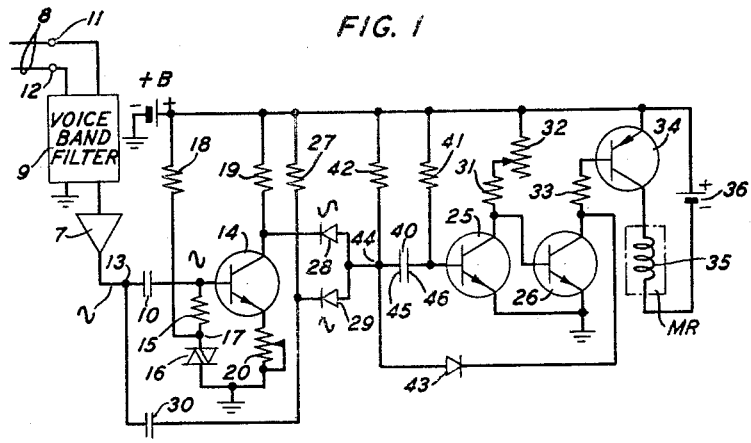
FIG. 1 is a schematic circuit illustrating a specific embodiment of the invention.

Referring to FIG. 1, it is seen that noise impulse peak voltages of positive and negative polarities derived from a voice frequency data transmission circuit 8 under test are applied via input terminals 11 and 12, suitable voice frequency weighting filter 9, amplifier 7 to a common terminal 13. This filter may comprise one or more discrete filters for selecting noise impulses in correspondence with one or more noise voice-frequency bands which are related to the data processing equipment, not shown, to be connected to the data transmission circuit. Capacitor 10 couples common point 13 to the base of transistor rectifier inverter 14 which is operated as a class B amplifier. This is achieved by having the transistor base held at cut-off potential via resistor 15 and oppositely poled breakdown twin rectifier 16 which are serially connected between the base of rectifier 14 and ground and which have a junction point 17 connected through fixed resistor 18 to the +B voltage supply whereby the rectifier is biased in the forward direction. The collector of inverter 14 is connected through fixed resistor 19 to the +B voltage supply while its associated emitter is connected through an adjustable resistor 20 to ground. The diode 16 tends, for example, to maintain the transistor base potential at cutoff for variations of the +B voltage say, for example, of the order of 2 volts. Positive voltage peaks applied via capacitor 10 to the inverter base are changed to negative peak voltages in the inverter collector circuit while negative peak voltages applied to the same inverter base serve merely to drive the base further into the cut-off potential. Obviously, the latter peak voltages produce no signals in the associated collector circuit. In addition to the phase inversion of the input positive noise peak voltages to corresponding negative peak voltages in the inverter collector circuit as just mentioned, the inverter provides signal gain as determined essentially by the resistance ratio 19/20. This gain serves a purpose that is hereinafter explained. This ratio, and as a consequence the gain, is varied in the desired direction by appropriate adjustments of resistor 20.

A familiar type of monostable trigger or flip-flop circuit comprises transistors 25 and 26 so arranged that the collector of transistor 25 is connected to the base of transistor 26 while the emitters of both transistors are connected to ground. The collector of transistor 25 is connected through series fixed resistor 31 and a calibrating potentiometer 32 to +B voltage supply. The opposite end of the potentiometer is at ground potential. This potentiometer serves to fix the operating point of the trigger circuit.

The collector of transistor 26 is connected through fixed resistor 33 to the base of transistor 34 whose emitter is connected to the +B voltage supply and whose collector is connected via operating winding 35 of a message register MR to a source 36 of suitable operating potential. It is obvious that a magnetic core memory device, a stepping gas tube or the like could be substituted for the message register. Normally, in the absence of noise peak voltages originating in the data transmission circuit 8 under test, transistor 26 is cut off thereby essentially cutting off conduction in transistor 34 to de-energize the operating winding of the message register. The message register comprises a well-known type which operates to record one noise peak voltage count each time that transistors 26 and 34 are activated to the conductive state for energizing the operating winding of the message register in a manner that is hereinafter described.

In accordance with the specific embodiment of the present invention, it is shown in FIG. 1 that rectifier 28 has its cathode connected to a junction point of the collector of inverter 14 and one terminal of resistor 19 whose opposite terminal is connected to the +B supply. Rectifier 29 has its cathode connected via resistor 27 to the +B supply and via capacitor 30 to input common point 13. Capacitor 40 couples the base of transistor 25 to the anodes of rectifiers 28 and 29, resistor 41 connects plate 46 of capacitor 40 to the +B voltage supply, and resistor 42 connects plate 45 of capacitor 40 to the +B voltage supply. Diode rectifier 43 has its anode connected to a junction point 44 for the anodes of rectifiers 28 and 29, resistor 42 and capacitor plate 45. The cathode of rectifier 43 is connected to the collector of transistor 26.

In the operation of the above-described circuitry, transistor 25 is normally conducting due to current flow from the +B voltage supply through resistor 41 to the base of transistor 25 which is thereby driven into saturation. This enables current flow to continue from the base of transistor 25 through its associated base-emitter circuit to ground. This saturation depresses the collector potential of transistor 25 to a magnitude below that of its associated base. The collector potential of conducting transistor 25 adjustable via potentiometer 32 determines the base potential of transistor 26 whereby the latter is normally held in the cut-off state.

During the conduction of transistor 25 and the nonconduction of transistor 26, capacitor 40 is charged in a path including the +B supply, resistor 42, capacitor 40, base-emitter junction of conducting transistor 25 to ground and back through the +B supply. As a consequence of such charge, plate 45 of capacitor 40 is provided with a potential which is higher than that obtained on its associated plate 46. In other words, the voltage of capacitor plate 46 is negative relative to that of its associated plate 45. Since transistor 26 is nonconducting as previously mentioned, a very small amount of current is flowing in its collector circuit and therefore a very little amount of current is flowing through resistor 33, and a corresponding amount of current is flowing in the operating winding 35 of the message register. Due to such limited current flow in the base-emitter junction of transistor 34, it is held at cutoff.

Because no current is flowing in resistors 19 and 27 and no noise impulse peaks are present at input terminals 11 and 12, rectifiers 28 and 29 have substantially the same voltage on their respective cathodes and anodes. That is, the voltage effective via resistor 19 on the cathode of rectifier 28 is substantially the same in magnitude as that applied through resistor 42 to its associated anode. Similarly, the voltage provided via resistor 27 to the cathode of rectifier 29 is substantially identical in magnitude with that effected through resistor 42 on its associated anode. As a consequence of such substantially identical cathode and anode voltages of the respective rectifiers 28 and 29, both rectifiers are effectively biased to slightly below the threshold of conduction. In addition, the magnitude of the voltage applied via resistor 42 and plate 45 of capacitor 40 to the anode of rectifier 43 is substantially the same as that applied via resistor 33 and transistor 34 to the cathode of rectifier 43. Hence this rectifier is effectively biased to slightly below the threshold of conduction. Adjustable resistor 20 associated with inverter 14 provides that the effect of the negative voltage applied to the cathode of rectifier 28 is substantially equal to the effect of the negative voltage applied to the cathode of rectifier 29. It is thus apparent that negative impulse voltages substantially of the same order of magnitude are supplied to the cathode of the respective rectifiers 28 and 29.

Now, suppose that a noise peak voltage of opposite polarities originating on data transmission circuit 8 under test is applied via input terminals 11 and 12, filter 9, amplifier 7, common point 13, and capacitor 10 to the base of inverter 14. It is noted that amplifier 7 is +B limited and can provide an output which is no greater than 7.0 volts for the purpose of this description. The positive portion of such voltage is translated into a negative voltage effective in the collector circuit of inverter 14 and applied to the cathode of rectifier 28 which is thereby caused to conduct. Or, suppose that a negative noise peak voltage is applied from the output of amplifier 7 and common point 13 through capacitor 30 to the cathode of rectifier 29. This rectifier is also thereby caused to conduct. Since only one such negative voltage is applied to either rectifier 28 or 29 at a given time, then only one of the rectifiers conducts at that time. It is therefore obvious that rectifiers 28 and 29 are so connected in circuit as to provide full-wave rectification with regard to the noise peak voltages of alternating polarity originating on the data circuit 8 under test and supplied to input terminals 11 and 12. The circuit action described hereinafter is the same for the conduction of either rectifier 28 or 29 caused in the manner aforenoted.

Figure 2:
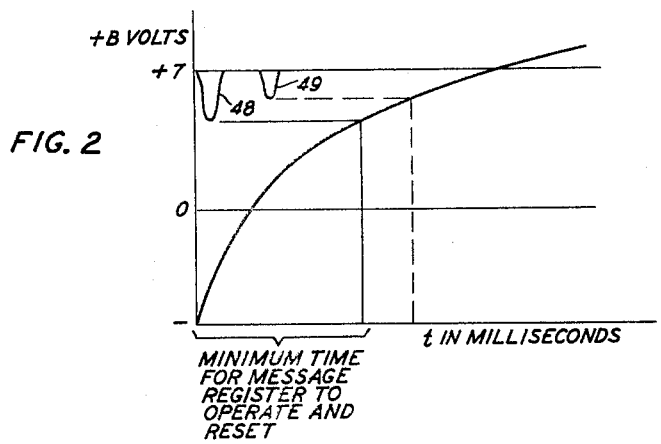
FIG. 2 is a curve representing action obtainable in the circuit of FIG. 1.

Assuming the conduction of rectifier 28 for the purpose of the instant explanation, then a negative impulse voltage 48 effected at the collector of inverter 14 and having a magnitude illustrated in FIG. 2 is applied through rectifier 28 and capacitor 40 to the base of transistor 25 which is thereby rendered nonconducting or turned off. This causes the voltage at the collector of transistor 25 to increase approximately to that of the +B supply. This collector voltage applied to the base of transistor 26 institutes conduction therein whereupon the voltage of its collector reaches the saturation magnitude. This collector voltage applied via resistor 33 to the base of transistor 34 causes conduction therein so that this transistor saturates. The entire voltage of battery 36 is applied at this time through conducting transistor 34 and the operating winding of the message register which is thereby actuated to record a count of one noise impulse peak voltage.

Now, a potential is established across rectifier 43 in the conductive direction in the path comprising the +B voltage supply, resistor 41, capacitor 40, rectifier 43, and collector-emitter circuit of conducting transistor 26 to ground and back to the +B supply. This potential renders rectifier 43 conductive. This enables capacitor 40 to discharge in the path including its plate 45, conducting rectifier 43, the collector-emitter circuit of conducting transistor 26 to ground and back through the +B voltage supply and resistor 41 to its plate 46. Substantially, at the same time, capacitor 40 is charged in the path including +B supply, resistor 41, capacitor 40, conductive rectifier 43, conducting transistor 26 to ground and back to the +B supply. In due course capacitor 40 is charged in the opposite direction so that the higher voltage magnitude is now effective on its plate 46 whereas its associated plate 45 is effectively at a negative voltage relative thereto. As the voltage across capacitor 40 cannot instantaneously change and since, for example, a voltage of approximately 6.5 volts was effective thereacross, the base potential of transistor 25 was approximately 6 volts below ground at the instant when it was rendered nonconductive.

As the new charge on capacitor 40 is rising in an exponential manner toward +7.0 volts, as illustrated in FIG. 2, the potential applied to the base of transistor 25 is also provided in a correspondingly exponential manner. This continues until the voltage effective on plate 46 of capacitor 40 as applied to the base of transistor 25 is of sufficient magnitude say, for example, approximately +0.5 volt to re-establish conduction in transistor 25. Capacitor 40 is now supplied with a charge of the order of 0.3 volt in such manner that its plate 46 is more positive than its plate 45; or, in other words the capacitor plate 45 is negative relative to its associated plate 46. At this time the magnitude of the potential applied to the cathodes of rectifiers 28 and 29 is effectively equal to that of the +B supply but the voltage effective on the anodes of the respective rectifiers is slightly above ground to the order of 0.2 or 0.3 volt whereby both rectifiers are effectively biased in the reverse direction to a magnitude substantially equal to that of the +B voltage. At the time when transistor 25 was turned ON and transistor 26 OFF, the collector circuit of transistor 26 was effectively disconnected from the message register, and rectifier 43 was back-biased to nonconduction via resistor 33 and transistor 34 effectively to the voltage of the +B supply.

Succeeding negative noise peak voltages may continue to be applied to the cathodes of rectifiers 28 and 29 at this time, because they are still originating in the data transmission circuit 8 under test as illustrated by impulse voltage 48 in FIG. 2. Since such noise peak voltages cannot exceed 7.0 volts, as determined by amplifier 7 in the manner previously mentioned, both rectifiers 28 and 29 are held nonconductive to such succeeding noise voltages for the reason that they are biased in the reverse direction by the exponentially increasing voltage charge on capacitor 40 to a magnitude amounting to that of the +B supply as just mentioned. This precludes any further noise peak voltages from activating transistor 25 to the OFF state and transistor 26 to the ON state at the moment. It is therefore apparent that when a first negative voltage due to a first noise peak voltage originating in the data transmission circuit 8 under test is applied through either rectifier 28 or 29 and capacitor 40 to transfer conduction from transistor 25 to transistor 26 in the trigger circuit as previously explained, both of the latter rectifiers are biased substantially immediately in the reverse direction in the manner just described, and remain so biased for the purpose just mentioned and for a time interval that is presently mentioned.

The time constant of the RC network comprising resistor 42 and capacitor 40 is chosen so that succeeding negative noise pulses originating in the data transmission circuit 8 under test and made effective at the cathodes of rectifiers 28 and 29 in the manner previously explained are precluded from further activating the trigger circuit and so that rectifier 43 is back-biased to nonconduction until the message register has operated and reset to the normal state after recording one preceding noise peak voltage. This condition obtains while capacitor 40 is recharged in an exponential manner as shown in FIG. 2 in a path including resistor 42, capacitor 40, base emitter circuit of conducting transistor 25 to ground and back through the +B supply to resistor 42, and until the charge on capacitor plate 45 provides: (1) a voltage to the anode of rectifier 43 with a magnitude which is substantially equal to that of the back-biasing voltage supplied to its associated cathode as hereinbefore noted and (2) to the anodes of rectifiers 28 and 29 with a magnitude which is substantially equal to that of the voltage applied via resistors 19 and 27 to their associated cathodes whereby the three rectifiers are again biased to the threshold of conduction as previously mentioned, in preparation for the recording of a succeeding noise peak voltage by the message register. During the time interval required for the charging of capacitor 40 in the path just mentioned, the collector of transistor 26 is effectively disconnected from the operating circuit of the message register by the back-biased rectifier 43. The count of the number of impulse noise peak voltages by the message register over a preselected magnitude within a predetermined time interval in the manner afore-described serves to indicate the suitability of the particular data transmission circuit under test for use with voice-band data transmission facilities.

Referring to FIG. 2, negative noise pulse 48 is indicated with the maximum amplitude that could be provided at the cathode of either rectifier 28 or 29 whereby the minimum amount of time is required for the message register to operate and reset itself. For negative noise pulses having a smaller amplitude, as indicated by pulse 49 in FIG. 2, the allowable operate-reset time for the message register would be correspondingly longer.

At the time conduction was re-established in transistor 25, conduction in transistor 26 was immediately terminated whereby the collector voltage of transistor 26 was returned through resistor 33 and transistor 34 to the voltage of the +B supply. This +B voltage serves to back-bias rectifier 43 whereby the latter is turned off. At this time, it is seen that rectifiers 28, 29 and 43 are simultaneously back-biased to nonconduction. The time interval covering the effective disconnection of the collector circuit of transistor 26 from the base of transistor 34 and thereby from the operating winding of the message register enables the latter to return to its normal condition. This time interval tends to compensate for the mechanical inertia of the message register whereby the message register is permitted to operate and reset itself for recording one noise impulse voltage present at input terminals 11 and 12, as illustrated in FIG. 2. Thus, the message register requires at least a finite time to operate and reset for each count of one noise impulse, but tends to jam when the noise impulses are repeated within such finite time. In other words, noise impulses occurring within such finite time are treated as if they did not exisit and are therefore not counted or are nullified.

The charging of capacitor 40 continues until it reaches a point at which the voltage applied to the cathodes and anodes of rectifiers 28 and 29 are substantially equal in magnitude, and at which the voltage effective on the anode of rectifier 43 is also substantially equal to that on its cathode whereupon the circuit is restored to the normal condition. The rectifiers 28, 29 and 43 are again biased to the threshold of conduction.

Figure 3:
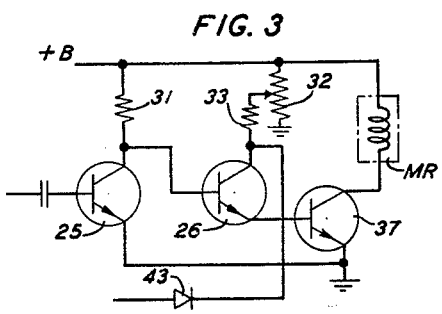
FIG. 3 is a modification that may be included in FIG. 1.

FIG. 3 is a modification of FIG. 1 in which the emitter of transistor 26 is connected to the base of transistor 37 whose collector is connected through the operating winding of the message register to the positive terminal of the +B supply. The emitters of transistors 25 and 37 are connected to ground. The operation of FIG. 3 is essentially the same as that of its counterpart in FIG. 1 except it allows use of an NPN rather than a PNP semiconductor device.

It is to be understood that the above-described embodiment is merely illustrative of the application of the invention. Numerous other embodiments may occur to those skilled in the art without departing from the spirit and scope of the invention.

What is claimed is:

1. Apparatus for counting impulse voltages, comprising a source of said impulse voltages having positive and negative polarities, means for translating said impulse voltages of positive polarity into impulse voltages of negative polarity, said means having an input terminal connected to said source and also including an output terminal, unidirectional conductive means poled in a direction toward said source and normally positively biased in forward and reverse directions to nonconduction, said unidirectional means having two input terminals and an output terminal, one of said two input terminals connected to said translating means output terminal and the other to said source, said unidirectional means rendered conductive in the reverse direction by discrete impulse voltages of negative polarity to transmit the last-mentioned voltages through said unidirectional means in the reverse direction to be counted, means connected to said unidirectional means output terminal and activated by said impulse voltages of negative polarity transmitted through said unidirectional means in the reverse direction to effect a count thereof, said counting means having a finite time to operate and return to normal upon the counting of each of said last-mentioned impulse voltages but tending to jam in an endeavor to count other impulse voltages of negative polarity transmitted through said unidirectional means in the reverse direction during said finite time, and means responsive to the activation of said counting means to bias said unidirectional means additionally in the forward direction to re-establish nonconduction in said last-mentioned means in the reverse direction thereby blocking the transmission of said other impulse voltages of negative polarity through said last-mentioned means in the reverse direction during said finite time.

2. The apparatus according to claim 1 which includes a second unidirectional conductive means having an input terminal connected to a point common to said output terminal of said first-mentioned unidirectional means and said biasing means, said second unidirectional means having an output terminal connected to said counting means.

3. The apparatus according to claim 2 in which said biasing means includes a capacitor having a first plate connected to said point common to said first-mentioned unidirectional means output terminal and said second unidirectional means input terminal, said capacitor also having a second plate connected to an input terminal of said counting means.

4. In combination, a device for counting impulse voltages, said device having a finite time to operate and return to normal upon counting each of said impulse voltages, a source of said impulse voltages of positive and negative polarities, means for translating said impulse voltages of positive polarity into impulse voltages of negative polarity, said means having an input terminal connected to said source and also having an output terminal, unidirectional conductive means poled in a direction toward said source and normally positively biased in forward and reverse directions to nonconduction, said unidirectional means having two input terminals and an output terminal, one of said two input terminals connected to said translating means output terminal and the other input terminal to said source, said unidirectional means rendered conductive by said impulse voltages of negative polarity for transmitting said last-mentioned voltages through said unidirectional means in the reverse direction to be counted, a circuit having an input terminal connected to said unidirectional means output terminal and an output terminal connected to said device, said circuit activated by each impulse voltage of negative polarity transmitted through said unidirectional means in the reverse direction to provide a voltage for operating said device to count said last-mentioned impulse voltage, and means responsive to each activation of said circuit to bias said unidirectironal means additionally in the forward direction to nonconduction for blocking the transmission therethrough of other impulse voltages of egative polarity applied to said unidirectional means during said finite time.

5. The combination according to claim 4 which includes a second unidirectional conductive means having an input terminal connected to a point common to said output terminal of said first-mentioned unidirectional conductive means and said input terminal of said circuit, said second unidirectional conductive means having an output terminal connected to a point common to said circuit output terminal and device.

6. The combination according to claim 5 in which said translating means comprises a phase inverter having an input terminal connected to said voltage source and an output terminal, said first-mentioned unidirectional means comprises a pair of rectifiers, each including a cathode and an anode, one of said cathodes connected to said translating means output terminal and the other of said cathodes to said impulse voltage source and both said anodes connected to said circuit input terminal, said second unidirectional means comprising a third rectifier having an anode connected to both said first-mentioned anodes and said circuit input terminal, said third rectifier having a cathode connected to said point common to said circuit output terminal and device.

7. Apparatus for counting impulse voltages, comprising a source of said impulse voltages having negative and positive polarities, means for translating said impulse voltages of positive polarity into impulse voltages of negative polarity, said means having an input terminal connected to said source and an output terminal, first unidirectional conducting means poled in a direction toward said source and normally positively biased in forward and reverse directions to nonconduction, said unidirectional means having two input terminals and an output terminal, one of said two input terminals connected to said translating means output terminal and the other to said source, said unidirectional means rendered conducting by one of said impulse voltages of negative polarity for transmitting said last-mentioned one impulse voltage through said unidirectional means to be counted, trigger means comprising a pair of amplifying elements so arranged that normally a first element has an input terminal connected to said unidirectional means output terminal and is conducting while a second element having an output terminal is nonconducting in the absence of an impulse voltage at the output terminal of said first unidirectional means, said trigger means activated by said one impulse voltage of negative polarity transmitted through said first unidirectional means to transfer conduction from said first amplifying element to said second amplifying element which thereupon provides a voltage at said output terminal thereof, means connected to said second element output terminal and operated by said last-mentioned voltage to count said one impulse voltage of negative polarity transmitted through said first unidirectional means, said counting means requiring a finite time to operate and to return to normal upon counting said one impulse voltage of negative polarity and tending to jam in response to another voltage of negative polarity effective at said second amplifying element output terminal corresponding to another impulse voltage of negative polarity transmitted through said first unidirectional means during said finite time, voltage storage means charged in one polarity direction in response to conduction in said second amplifying element for applying a negative biasing voltage to said output terminal of said first unidirectional means and thereby to said last-mentioned means in the forward direction for rendering said last-mentioned means nonconducting, thereby blocking the transmission therethrough of said other impulse voltage of negative polarity to be counted during said finite time, said voltage storage means also charged in a polarity direction opposite to said one polarity direction to transfer conduction from said second amplifying element back to said first amplifying element at the end of said finite time, and second unidirectional conducting means having an input terminal connected to a point common to said first-mentioned unidirectional means output terminal and said voltage storing means, said second unidirectional means having an output terminal connected to said second element output terminal for discharging said voltage storing means through said last-mentioned second element in the conducting state upon the transmission of a further impulse voltage of negative polarity through said first unidirectional means at the end of said finite time.

8. The apparatus according to claim 7 in which said translating means comprises a phase inverter connected between said input and output terminals of said last-mentioned means, and said unidirectional means comprises a pair of unidirectional conductive devices, each having a cathode and an anode, said cathode of one of said devices connected to said output terminal of said phase inverter, said phase inverter input terminal and said cathode of the second of said devices connected to said voltage source, said anodes of both said rectifiers connected to said first-mentioned unidirectional means output terminal and thereby to said common point.

9. The apparatus according to claim 8 in which said phase inverter comprises a transistor including a base, a collector and an emitter, said base constituting said phase inverter input terminal and coupled to said source of positive and negative impulse voltages, said collector constituting said phase inverter output terminal and connected to said cathode of said one unidirectional device, and said emitter connected to ground.

10. The apparatus according to claim 9 in which said translating means further includes a supply of direct current voltage, oppositely poled twin diodes having one terminal connected to ground, and resistance means connecting said transistor base to another terminal of said twin diodes and to said voltage supply, said twin diodes and resistance means holding said transistor in the cut-off condition for a predetermined variation in the voltage magnitude of said last-mentioned supply during the absence of impulse voltages of positive and negative polarities at said source.

11. The apparatus according to claim 10 in which said translating means also includes a fixed resistor connecting said transistor collector to said voltage supply, and an adjustable resistor connected between said transistor emitter and ground whereby the gain of said transistor is determined by the ratio of the resistance of said fixed resistor to the effective resistance of said adjustable resistor at a given time.

12. The apparatus according to claim 11 in which said cathode of said one device is connected to a point common to said collector and said fixed resistor.

13. The apparatus according to claim 7 in which said first and second amplifying elements comprise first and second transistors, respectively, each having a base, a collector and an emitter, said base of said first transistor constituting said first element input terminal coupled through said voltage storage means to said first unidirectional conductive means output terminal, said collector of said first transistor connected to said base of said second transistor, said first and second transistors having their emitters connected to ground, said first transistor being normally conducting to apply an output voltage from said collector thereof to said base of said second transistor for holding said last-mentioned transistor nonconductive in the absence of said impulse voltages at said source, and said collector of said second transistor constituting said second element output terminal connected to said counting means.

14. The apparatus according to claim 13 which includes a third transistor for connecting said second transistor collector output terminal to said counting means, said third transistor having at least a base and a collector, said third transistor base connected to said second transistor collector output terminal and said third transistor collector connected to said counting means.

15. The apparatus according to claim 14 which includes first and second sources of direct current voltage having terminals of positive polarity connected together, and in which said third transistor includes an emitter connected to said last-mentioned terminals of like polarity, and said counting means comprises an operating winding having one terminal connected to said third transistor colector and an opposite terminal connected to a negative terminal of one of said first and second voltage sources.

16. The apparatus according to claim 7 in which said voltage storing means comprises a capacitor having one plate connected to the output terminal of said first unidirectional means and another plate to said input terminal of said first amplifying element, said one capacitor plate provided with an effectively negative voltage in response to said second amplifying element output terminal voltage for biasing said first unidirectional means in a forward direction to the nonconduction state thereby blocking the transmission of further impulse voltages therethrough during said finite time, and subsequently said other capacitor plate provided with an effectively positive voltage at said input terminal of said first amplifying element for re-establishing conduction therein and simultaneously terminating conduction in said second amplifying element for holding said last-mentioned element in the nonconducting state, and subsequently said one capacitor plate provided with an effectively positive voltage in response to the re-establishment of conduction in said first amplifying element for nullifying the reverse bias voltage applied to said first unidirectional means after the termination of said finite time whereupon said last-mentioned means is restored to the normally positively biased nonconductive state.

17. The apparatus according to claim 16 in which said second unidirectional means includes a third rectifier having an anode and a cathode, said last-mentioned anode connected to a point common to said first unidirectional means output terminal and said one capacitor plate and said last-mentioned cathode connected to said second amplifying element output terminal, said third rectifier discharging the voltage charge between said one and other capacitor plates through said conducting second amplifying element to ground in response to the institution of conduction therein.

18. The apparatus according to claim 17 which includes a supply of +B voltage having ground and positive terminals, and a resistor, said last-mentioned resistor having a first terminal connected to the positive terminal of said +B supply and a second terminal common to said other capacitor plate and said input terminal of said first amplifying element, said capacitor acquiring said voltage charge between said one and other plates in said one polarity direction through a path including said conductive third rectifier, said second amplifying device having conduction instituted therein to ground, said +B supply and said resistor.

19. The apparatus according to claim 18 which includes a further resistor having one terminal connected to the positive terminal of said +B supply and another terminal connected to said point common to said first unidirectional means output terminal and said voltage storage means and thereby to said one plate of said capacitor whose other plate is connected to the input terminal of said first amplifying element, said capacitor acquiring said voltage charge across said one and other plates in said opposite polarity direction in a path including said first amplifying element in the conducting state to ground, said +B supply and said further resistor.

20. The apparatus according to claim 7 which includes a supply of +B voltage and in which said voltage storing means comprises a capacitor, a first resistor having one terminal connected to said +B supply and another terminal connected to a point common to a first plate of said capacitor and the input of said first amplifying device, and a second resistor having one terminal connected to said +B supply and another terminal connected to said point common to said first unidirectional means output terminal and said voltage storing means and thereby to a second plate of said capacitor, and said second unidirectional means comprises a rectifier including an anode and a cathode, said anode constituting said second unidirectional means input terminal connected to said common point, and said cathode constituting said second unidirectional means output terminal connected to said output terminal of said second amplifying element, said last-mentioned rectifier rendered conductive in response to the institution of conduction in said second amplifying element, said capacitor receiving said voltage charge of said one polarity between said first and second plates in a path including said first resistor, said capacitor, said conductive last-mentioned rectifier, said output terminal of said second amplifying element in the conductive state to ground, said +B supply, and said first resistor, said capacitor receiving said voltage charge of opposite polarity between said first and second plates in a path including said second resistor, said capacitor, said first amplifying device in the conductive state to ground, said +B supply, and said second resistor.

21. The apparatus according to claim 7 which includes a first supply of direct current voltage having a positive terminal, a second supply of direct current voltage having a positive terminal connected to said first supply positive terminal and having a negative terminal, a transistor amplifier including a base, a collector and an emitter, said base connected to said second amplifying element output terminal, said emitter connected to said positive terminals of said first and second voltage supplies, and said counting means including input and output terminals, said second amplifying output terminal connected through said transistor base and collector to said counting means input terminal, and said counting means output terminal connected to said second supply negative terminal.

22. The apparatus according to claim 7 in which said first and second amplifying elements comprise first and second transistors, respectively, each including a base, a collector and an emitter, and which includes a supply of direct current voltage having a negative terminal at ground and a positive terminal, and a third transistor having a base, a collector and an emitter, said first and third transistor emitters connected to ground, said first transistor collector connected to said second transistor base, said first transistor base having a terminal constituting said first amplifying element input terminal, said second transistor emitter connected to said third transistor base, said second transistor collector connected to said supply positive terminal and to said output terminal of said second unidirectional means, and said counting means having an input terminal connected to said third transistor collector and an output terminal connected to said supply positive terminal.

References Cited in the file of this patent
UNITED STATES PATENTS

| | | |
|---|---|---|
| 2,924,708 | Harrison | Feb. 9, 1960 |
| 2,992,340 | Floyd | July 11, 1961 |
| 3,061,788 | Kobbe | Oct. 30, 1962 |